Patented Oct. 11, 1938

2,132,620

UNITED STATES PATENT OFFICE 2,132,620

PROCESS FOR THE COLORATION OF ARTIFICIALLY PRODUCED OXIDE FILMS ON ALUMINUM AND ITS ALLOYS

Frederick Hill and Jack Augustus Radley, Blackley, Manchester, England, assignors to Imperial Chemical Industries Limited, a corporation of Great Britain No Drawing. Application January 12, 1938, Serial No. 184,710. In Great Britain January 18, 1937

2 Claims. (Cl. 148—6)

The present invention relates to methods of coloring artificially produced oxide films on aluminum and its alloys, more especially to dyeing so-called anodized aluminum.

This invention has as an object to devise a new method of dyeing such oxide films. A further object is to produce artificial oxide films colored by the new process. Further objects will appear hereinafter.

These objects are accomplished by the following invention. We have found that we can color such artificial oxide films by treating them in a dyebath containing an ester salt of a leuco vat dyestuff of the anthraquinone series and thereafter developing the shade by treatment with a suitable acid oxidizing agent.

The following examples illustrate but do not limit the invention. The parts are by weight.

Example 1

5 parts of Soledon Jade Green paste as commercially supplied (see Schultz, Farbstofftabellen, 7th edition, No. 1288) are dissolved in 100 parts of water, and 0.5 part of acetic acid (30%) are added. The temperature is adjusted to 60° C. and anodized aluminum is immersed in this dyebath for 10 minutes. After rinsing the material, the color is developed by immersing for 5 minutes at ordinary temperature in a bath containing 1 part sodium nitrite and 1 part hydrochloric acid per 1000 parts water. A bright green shade is obtained.

Example 2

In place of Soledon Jade Green of Example 1 there are taken 5 parts of Soledon Brilliant Purple 2R paste as commercially supplied (see Schultz Farbstofftabellen, 7th edition, No. 1288), the procedure being otherwise the same. A bright violet shade of good fastness to heat is obtained.

This invention is a valuable advance in the art as by it we can obtain shades of good tinctorial strength and fastness to light, water and heat. In this latter respect they are superior to any other range of dyestuffs at present in this type of work and will enable aluminum products to be dyed fast to heat, such as utensils constantly in contact with hot water, reflectors for lights, radiators and the like.

As many apparently widely different embodiments of this invention may be made without departing from the spirit and scope thereof, it is to be understood that we do not limit ourselves to the specific embodiments thereof except as defined in the appended claims.

We claim:

1. Process for the coloration of artificially produced oxide films on aluminum and its alloys which comprises treating such films with a dyebath containing a sulphuric ester of a leuco vat dyestuff of the anthraquinone series and thereafter developing the shade by means of an acid oxidizing agent.

2. A process according to claim 1 in which the sulphuric ester of a leuco vat dyestuff of the anthraquinone series which is used in the dyebath is a dyestuff that is described under No. 1288 in Schultz, Farbstofftabellen, 7th edition, and the acid oxidizing agent which is employed is an aqueous solution containing sodium nitrite and an acid.

FREDERICK HILL.
JACK AUGUSTUS RADLEY.